US012665195B2

(12) United States Patent
Okazaki et al.

(10) Patent No.: US 12,665,195 B2
(45) Date of Patent: Jun. 23, 2026

(54) NEGATIVE ELECTRODE ACTIVE MATERIAL FOR SECONDARY BATTERY, AND SECONDARY BATTERY USING SAME

(71) Applicant: Panasonic Intellectual Property Management Co., Ltd., Kadoma (JP)

(72) Inventors: Keita Okazaki, Osaka Fu (JP); Yohei Uchiyama, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 429 days.

(21) Appl. No.: 18/275,922

(22) PCT Filed: Jan. 12, 2022

(86) PCT No.: PCT/JP2022/000625
§ 371 (c)(1),
(2) Date: Aug. 4, 2023

(87) PCT Pub. No.: WO2022/181083
PCT Pub. Date: Sep. 1, 2022

(65) Prior Publication Data
US 2024/0136523 A1    Apr. 25, 2024
US 2024/0234722 A9    Jul. 11, 2024

(30) Foreign Application Priority Data

Feb. 26, 2021    (JP) ................................. 2021-030888

(51) Int. Cl.
*H01M 4/58*       (2010.01)
*H01M 4/02*       (2006.01)
(Continued)

(52) U.S. Cl.
CPC ......... *H01M 4/5825* (2013.01); *H01M 4/364* (2013.01); *H01M 10/00* (2013.01); *H01M 2004/021* (2013.01); *H01M 2004/027* (2013.01)

(58) Field of Classification Search
CPC .................................................. H01M 4/5825
See application file for complete search history.

(56) References Cited

U.S. PATENT DOCUMENTS

2013/0216907 A1    8/2013   Rayner et al.
2015/0147658 A1    5/2015   Nakagaki et al.
(Continued)

FOREIGN PATENT DOCUMENTS

CN        103313937 A        9/2013
CN        111357140 A        6/2020
(Continued)

OTHER PUBLICATIONS

International Search Report dated Mar. 1, 2022, issued in counterpart International Application No. PCT/JP2022/000625 (5 pages).
(Continued)

*Primary Examiner* — Brian R Ohara
(74) *Attorney, Agent, or Firm* — WHDA, LLP

(57) ABSTRACT

A negative electrode active material for a secondary battery includes composite particles. The composite particles include a lithium silicate phase and a silicon phase dispersed in the lithium silicate phase, wherein the silicon phase has lined portions in the lithium silicate phase, a maximum diameter $D_1$ and a minimum diameter $D_2$ of the lined portions satisfy $3 \leq D_1/D_2$. The composite particles include a metal Me dispersed in the lithium silicate phase, and the metal Me is at least one selected from the group consisting of Fe, Pb, Zn, Sn, Cu, Ni, Cr, Zr, and Ti.

6 Claims, 3 Drawing Sheets

(51) Int. Cl.
  *H01M 4/36* (2006.01)
  *H01M 10/00* (2006.01)

(56) References Cited

U.S. PATENT DOCUMENTS

| | | | |
|---|---|---|---|
| 2020/0020932 A1 | 1/2020 | Asano et al. | |
| 2020/0350563 A1 | 11/2020 | Uchiyama et al. | |
| 2020/0365879 A1 | 11/2020 | Yamamoto et al. | |
| 2021/0057727 A1* | 2/2021 | Akira | H01M 10/0525 |
| 2021/0104728 A1 | 4/2021 | Akira et al. | |
| 2022/0037643 A1 | 2/2022 | Iwami et al. | |
| 2022/0263066 A1 | 8/2022 | Asano et al. | |

FOREIGN PATENT DOCUMENTS

| | | | |
|---|---|---|---|
| JP | 2007-059213 A | 3/2007 | |
| JP | 2014-010890 A | 1/2014 | |
| JP | 2014-191936 A | 10/2014 | |
| WO | 2018/179934 A1 | 10/2018 | |
| WO | 2018/179969 A1 | 10/2018 | |
| WO | 2019/087771 A1 | 5/2019 | |
| WO | WO-2019151016 A1 * | 8/2019 | H01M 4/364 |
| WO | 2020/066576 A1 | 4/2020 | |
| WO | 2021/020226 A1 | 2/2021 | |

OTHER PUBLICATIONS

Extended (supplementary) European Search Report dated May 7, 2025, issued in counterpart EP Application No. 22759126.0. (9 pages).

Office Action dated Apr. 13, 2026, issued in counterpart CN Application No. 202280017013.2, with partial English translation. (7 pages).

* cited by examiner

NEGATIVE ELECTRODE ACTIVE MATERIAL FOR SECONDARY BATTERY, AND SECONDARY BATTERY USING SAME

CROSS REFERENCE TO RELATED APPLICATIONS

This Application is the National Stage of International Application No. PCT/JP2022/000625, filed on Jan. 12, 2022, which claims priority from Application No. 2021-030888 filed on Feb. 26, 2021 in Japan. The entire contents of these applications are incorporated herein by reference in their entirety.

TECHNICAL FIELD

The present invention relates mainly to a negative electrode active material for a secondary battery.

BACKGROUND ART

Recently, secondary batteries such as non-aqueous electrolyte secondary batteries are expected as a power source for small consumer applications, power storage devices, and electric vehicles, because of their high voltage and high energy density. With a demand for a high energy density in batteries, as a negative electrode active material having a high theoretical capacity density, use of a material containing silicon is expected.

Patent Literature 1 proposed a silicon-containing material as an active material for a secondary battery, the silicon-containing material including a continuous phase including silicon having a Si—Si bond and having a three-dimensionally continuous bubble skeleton; and a dispersion phase including a silicon having a Si—O bond and is in a dispersed state enclosed in a region defined by the continuous phase. Patent Literature 2 proposed a negative electrode for a non-aqueous electrolyte secondary battery, wherein in the negative electrode active material, a silicon network is formed, in which a portion where silicon is included at a high concentration is continuous as a three-dimensional net.

CITATION LIST

Patent Literature

PLT1: Japanese Laid-Open Patent Publication No. 2014-10890
PLT2: Japanese Laid-Open Patent Publication No. 2014-191936

SUMMARY OF INVENTION

Solution to Problem

In a secondary battery using a material including silicon as a negative electrode active material, improvement in initial charge and discharge efficiency and in cycle characteristics are demanded.

Solution to Problem

In view of the above, an aspect of the present invention relates to a negative electrode active material for a secondary battery including composite particles including a lithium silicate phase, and a silicon phase dispersed in the lithium silicate phase, wherein the silicon phase has lined portions in the lithium silicate phase, a maximum diameter $D_1$ and a minimum diameter $D_2$ of the lined portions satisfy $3 \leq D_1/D_2$, the composite particles include a metal Me dispersed in the lithium silicate phase, and the metal Me is at least one selected from the group consisting of Fe, Pb, Zn, Sn, Cu, Ni, Cr, Zr, and Ti.

Another aspect of the present invention relates to a secondary battery including a positive electrode, a negative electrode, and a non-aqueous electrolyte, wherein the negative electrode includes the negative electrode active material for a secondary battery described above.

Effects of Invention

With the present invention, initial charge and discharge efficiency and cycle characteristics of a secondary battery can be improved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
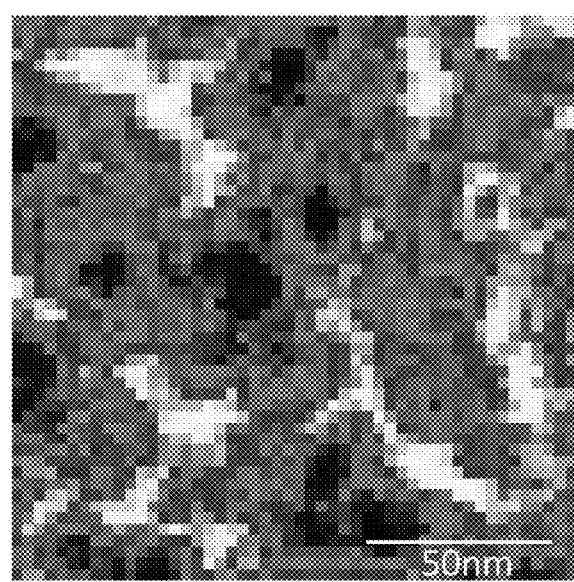
FIG. 1 shows an example of a distribution state of a silicon phase obtained by STEM-EELS analysis of a negative electrode active material for a secondary battery (composite particles) in an embodiment of the present invention.

[Negative Electrode Active Material for Secondary Battery]

The negative electrode active material for a secondary battery of an embodiment of the present invention includes composite particles including a lithium silicate phase and a silicon phase dispersed in the lithium silicate phase. The silicon phase has lined portions in the lithium silicate phase, and a maximum diameter $D_1$(nm) and a minimum diameter $D_2$(nm) of the lined portions satisfy $3 \leq D_1/D_2$. The composite particles include a metal Me dispersed in the lithium silicate phase, and the metal Me is at least one selected from the group consisting of Fe, Pb, Zn, Sn, Cu, Ni, Cr, Zr, and Ti. The silicon phase may form a net structure in the lithium silicate phase, and the lined portions may be lined portions of the net structure. In the following, a case where the silicon phase forms a net structure is described as an example, but the shape of the silicon phase is not particularly limited. The "lined" does not necessarily mean lines in a strict sense, and it may be branched, various types of rod shaped, or necked.

The above-described $D_1/D_2$ means a ratio of the maximum diameter $D_1$ relative to the minimum diameter $D_2$ of the lined portions: $D_1/D_2$ in a secondary battery in a completely discharged state (state where lithium ions are substantially released from the silicon phase). The above-described completely discharged state means a state where a secondary battery is discharged to 90% or more of a depth of discharge (DOD), and for example, a state where a secondary battery is discharged to a lowest voltage in a predetermined voltage range in the field of devices where the secondary battery is used.

The silicon phase dispersed in the silicate phase may form a net structure along with storing of lithium ions during charging. In this manner, a conductive network of the silicon phase is formed in the composite particles.

Conventionally, the net structure is formed with narrow lined portions $L_2$. The narrow lined portion $L_2$ is advantageous in terms of relieving stress caused by expansion and contraction of the silicon phase during charging and discharging, but the electron conductive path of the lined portion $L_2$ is shut down along with degradation of the silicon phase during charging and discharging, and may decrease the electrical conductivity inside the composite particles.

In contrast, in the present invention, the ratio of the maximum diameter $D_1$ relative to the minimum diameter $D_2$ of the lined portions forming the net structure: $D_1/D_2$ is set to 3 or more, and the thickness of the lined portion forming the net structure is varied, allowing a thick lined portion $L_1$ and a thin lined portion $L_2$ to coexist. The thick lined portion $L_1$ forms a thick electron conductive path, and an excellent conductive network is kept during charging and discharging. The electron conductive path between the thin lined portions $L_2$ is ensured through the thick lined portion $L_1$. Thus, it suppresses reduction in electrical conductivity in the composite particles based on shutting down of the electron conductive path of the lined portion $L_2$ due to degradation of the silicon phase during charging and discharging. $D_1/D_2$ may be 4 or more, or 5 or more.

By dispersing the metal Me having ductility in the silicate phase, concentration of local stress along with expansion and contraction of the thick lined portion $L_1$ during charging and discharging is relieved, cracking of the particles caused by the concentration of the stress is suppressed, and reduction in cycle characteristics along with the cracking of the particles is suppressed.

As described above, because reduction in electrical conductivity can be suppressed in the composite particles during charging and discharging and cracking of the particles can be suppressed, the initial charge and discharge efficiency and cycle characteristics improve greatly. Such effects can be achieved particularly when the silicon phase and the metal Me are dispersed in the lithium silicate phase, the silicon phase including the lined portions forming the net structure and the lined portion having various thicknesses with $D_1/D_2$ of 3 or more.

In view of relieving the local stress concentration along with expansion and contraction of the thick lined portion $L_1$ during charging and discharging, the maximum diameter $D_1$ may be 60 nm or less, or 40 nm or less. In view of keeping an excellent conductive network, the maximum diameter $D_1$ may be over 20 nm, or 21 nm or more.

In view of easily forming an excellent conductive network, the minimum diameter $D_2$ may be 1 nm or more, or 3 nm or more. In view of relieving the stress caused by expansion and contraction of the silicon phase during charging and discharging, the minimum diameter $D_2$ may be 15 nm or less, or 10 nm or less.

When a difference between $D_1$ and $D_2$ is more than 10 nm, the thick lined portion $L_1$ has a diameter in a range of, for example, $(D_2+10)$ nm or more and $D_1$ nm or less. The thin lined portion $L_2$ has a diameter in a range of, for example, $D_2$ nm or more and less than $(D_2+10)$ nm.

The diameter of the lined portion means a minimum value of the diameter passing the point where a coefficient $b_{Si}$ described later is the maximum in the lined portion. In view of keeping an excellent conductive network during charging and discharging, and easily suppressing cracking of the particles, in the above-described case, in the lined portions forming the net structure, the ratio of the number of the thin lined portions $L_2$, i.e., $NL_2$, relative to the number of the thick lined portions $L_1$, i.e., $NL_1$: $NL_2/NL_1$ may be, for example, 5 or more and 20 or less. In the above-described case, the difference between $D_1$ and $D_2$ may be, for example, 15 nm or more, or 15 nm or more and 65 nm or less. In the above-described case, $D_2$ may be, for example, 2 nm or more and 8 nm or less.

The silicon phase forming the net structure in the lithium silicate phase can be checked by element mapping with electron energy loss-spectroscopy (EELS), using cross sectional images of the composite particles with a scanning transmission electron microscope (STEM).

The above-described $D_1/D_2$ can be determined by the method below.

(1) Capturing Images of Composite Particles with Scanning Transmission Electron Microscope (STEM)

A battery (completely discharged state) is decomposed, and a negative electrode is taken out. The negative electrode (negative electrode mixture layer) is processed to be thin by a CP (cross section polisher) method, a FIB (focused ion beam) method, and the like, to obtain a thin film sample (e.g., thickness 30 nm) for STEM observation on negative electrode cross sections. Using the thin film sample, the cross sections of the negative electrode (composite particles) are observed with the STEM. The observation with the STEM was performed with a high magnification (e.g., 20000 to 1000000).

(2) Elemental Analysis on Electron Energy Loss-Spectroscopy (EELS)

Using an STEM image (dark field image) of cross sections of the composite particles, elemental analysis with the EELS is performed. The size (area) of the dark field image was, for example, $0.02\ \mu m^2$ to $2\ \mu m^2$. An example of silicon mapping on the composite particles after charge and discharge with STEM-EELS are shown in FIG. 1. In FIG. 1, the lighter area shows a higher silicon concentration. The lighter portion with a very high silicon concentration is distributed like a net, and substantially corresponds to the distribution of the silicon phase.

Preferable STEM-EELS measurement conditions are shown below.

<STEM-EELS measurement conditions>
   Measurement device: JEM-F200 (manufactured by JEOL Ltd.)
   EELS detector: Quantum ER (manufactured by Gatan, Inc.)
   Acceleration voltage: 200 kV
   Degree of vacuum: $1.0\times10^{-6}$ to $8.0\times10^{-5}$ Pa
   Dispersion: 0.050 eV/cH
   Spot size: 7
   Camera length: 40 mm
   Pixel time: 0.1 seconds (3) Map Formation on Silicon Phase From the EELS analysis data on the cross sections of the composite particles, the $SiO_2$ component derived from the silicate phase is separated and the Si component derived from the silicon phase is extracted to obtain a map of the silicon phase. The silicon phase is a phase of substantially a Si simple substance, and the Si component can be regarded as a component derived from the silicon phase. The silicate phase is represented by $Li_2O\cdot xSiO_2$, and the $SiO_2$ component can be regarded as a component derived from the silicate phase.

Specifically, the actual measurement value obtained in the EELS analysis is regarded as a value of an addition of the Si component and the $SiO_2$ component, and fitting is performed based on the formula below, and a coefficient $b_{Si}$ and a coefficient $b_{SiO2}$ are obtained. $b_{Si}+b_{SiO2}=1$ is satisfied.

Actual measurement value $=b_{Si}\times S_{Si}+b_{SiO2}\times S_{SiO2}$

Figure 2:
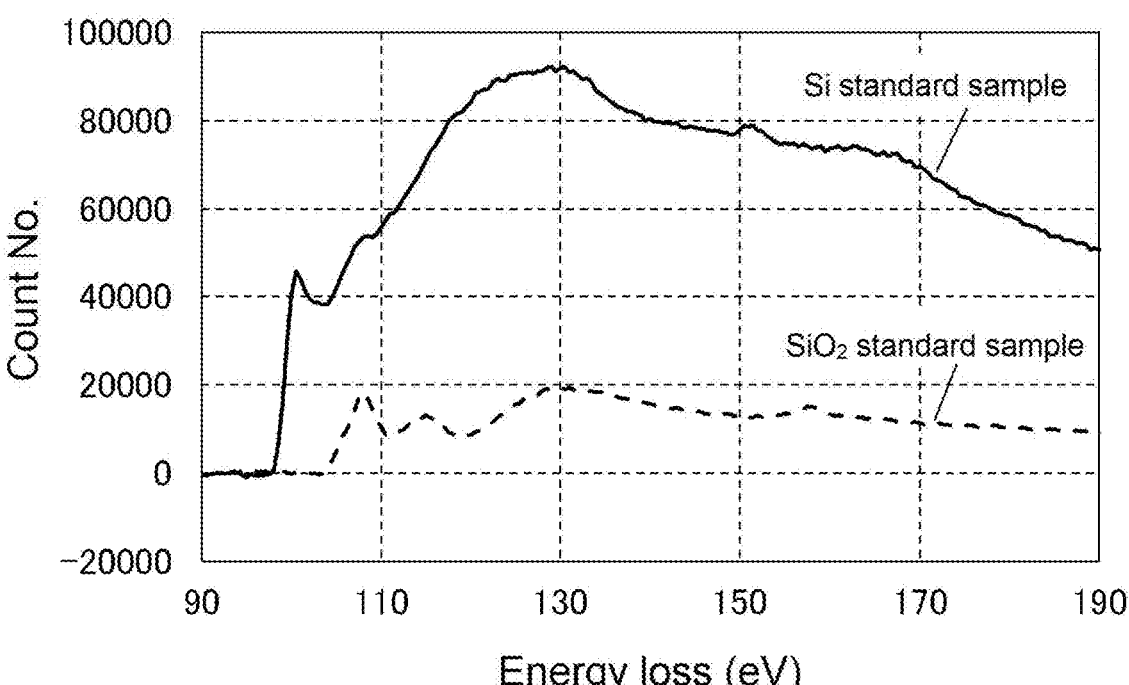
FIG. 2 shows an EELS spectrum of a standard sample of Si and a standard sample of $SiO_2$.

In the formula, $S_{Si}$ and $S_{SiO2}$ are each a spectrum value of standard samples of Si and $SiO_2$, respectively. The spectrum of the standard samples of Si and $SiO_2$ is based on data (data as shown in FIG. 2) of the EELS spectrum of the standard samples of Si and $SiO_2$ contained in the database of an image analysis software ("Gatan Microscopy Suite software" of Gatan, Inc.).

Based on the above-described fitting, the region with the coefficient $b_{Si}$ of 0.14 or more is regarded as the silicon phase, and extracted from the Si element map, to obtain a map of the silicon phase. From the map of the silicon phase obtained as described above, the silicon phase being distributed like a net is checked.

In the region with a large coefficient $b_{Si}$ value, the silicon phase thickness in the thin film sample tends to be large, and the diameter of the lined portion of the net structure checked by the silicon phase map described later tends to be large.

(4) Measurement of Maximum Diameter $D_1$ of Lined Portion Forming Net Structure In the lined portions of the net structure shown in the above-described silicon phase map, a point P1 where the coefficient $b_{Si}$ is the maximum (e.g., 0.234) is determined, and the minimum value of the diameter of the lined portion passing the point P1 is determined, and regarded as the maximum diameter $D_1$ (nm). When the point P1 is present in a plural number, the maximum diameter $D_1$ is determined for each point, and the largest of them all is selected.

(5) Measurement of Minimum Diameter $D_2$ of Lined Portion Forming Net Structure In the skeleton of the net structure shown in the above-described silicon phase map, a point P2 where the coefficient $b_{Si}$ is 0.150 is determined, and the minimum value of the diameter of the lined portion passing the point P2 is determined, and regarded as the minimum diameter $D_2$ (nm). When the point P2 is present in a plural number, the minimum diameter $D_2$ is determined for each point, and the smallest of them all is selected. The region where the coefficient $b_{Si}$ is less than 0.15 may include a silicon phase (portion other than the lined portions forming the net structure) distributed in dots in the above-described map.

(6) Arbitrary five points are observed in cross sections of the composite particles with STEM in the above-described (1), and $D_1$ and $D_2$ are determined based on the procedures of the above-described (2) to (5), and the average value of $D_1/D_2$ is calculated.

In view of relieving the stress caused by the expansion and contraction of the silicon phase during charging and discharging, more than half of the lined portions forming the net structure preferably has a diameter $D_3$ (nm) of 20 nm or less. That is, the ratio of the number of the lined portions having a diameter $D_3$ of 20 nm or less Ni relative to a total number of the lined portions forming the net structure $N_0$: $N_1/N_0$ is preferably larger than ½. The diameter $D_3$ of the lined portion here means the minimum value of the diameter passing the point where the coefficient $b_{Si}$ is the maximum at any one lined portion.

The above-described $N_1/N_0$ can be determined by the method below.

Ten to twenty lined portions forming the net structure are arbitrarily selected from the silicon phase map obtained as described above (3), and for each of the lined portions, a point P3 where the coefficient $b_{Si}$ is the maximum is determined, and the minimum value of the diameter of the lined portions passing the point P3 is determined, to be regarded as a diameter $D_3$ (nm). The ratio of the number of the lined portions having a diameter $D_3$ of 20 nm or less $N_1$ relative to a total number of the selected lined portions $N_0$, that is, $N_1/N_0$ is determined. $N_1/N_0$ was determined for the STEM image of arbitrary five points of the cross sections of the composite particles, and their average value is determined.

When the difference between $D_1$ and $D_2$ is more than 10 nm, the above-described $NL_2/NL_1$ can be determined by the method below.

Twenty to fifty lined portions forming the net structure are arbitrarily selected from the silicon phase map obtained as described above (3), and for each of the lined portions, a point P3 where the coefficient $b_{Si}$ is the maximum is determined, and the minimum value of the diameter of the lined portions passing the point P3 is determined, to be regarded as a diameter $D_3$ (nm). The lined portion having a diameter $D_3$ in a range of $(D_2+10)$ nm or more and $D_1$ nm or less is regarded as a lined portion $L_1$. The lined portion having a diameter $D_3$ in a range of $D_2$ nm or more and less than $(D_2+10)$ nm is regarded as a lined portion $L_2$. The number of the lined portions $L_1$ i.e., $NL_1$, and the number of the lined portions $L_2$ i.e., $NL_2$, are determined, and $NL_2/NL_1$ is calculated.

In the lithium silicate phase, the metal Me having ductility is dispersed. In this manner, cracking and collapsing of the composite particles caused along the expansion and contraction of the composite particles during charging and discharging are suppressed. The metal Me may be dispersed as particles in the lithium silicate phase. The metal Me is at least one selected from the group consisting of Fe, Pb, Zn, Sn, Cu, $N_1$, Cr, Zr, and Ti. In particular, in view of excellent ductility, the metal Me is preferably Fe, Pb, and Cu.

In view of suppressing side reactions with the electrolyte, the composite particles may contain the metal Me of 20 mass % or less, or 5 mass % or less. In view of suppressing cracking of the particles, the composite particles may contain the metal Me of 0.1 mass % or more, or 0.5 mass % or more.

The metal Me content in the composite particle (e.g., Fe) can be measured, for example, by an inductively coupled plasma emission spectroscopic analysis (ICP-AES). Specifically, a sample of the composite particles is completely dissolved in a heated acid solution (mixed acid of hydrofluoric acid, nitric acid, and sulfuric acid), and the carbon of the solution residue is filtered and removed, and thereafter, the obtained filtrate was analyzed with ICP-AES, to measure the spectrum intensity of the metal Me. Subsequently, a calibration curve is prepared using standard solutions of commercially available elements, and the amount of the metal Me contained is calculated.

The composite particles include a lithium silicate phase, a silicon phase dispersed in the lithium silicate phase, and the metal Me dispersed in the lithium silicate phase. The lithium silicate phase allows for obtaining composite particles with a small irreversible capacity and a high capacity. The lithium ions are stored in the silicon phase during charging, and lithium ions are released from the silicon phase during discharging. The silicon phase dispersed in the matrix of the lithium silicate phase allows for limited contacts between the silicon phase and the electrolyte, and side reactions are suppressed. The stress generated from the expansion and contraction of the silicon phase is relieved by the matrix of the lithium silicate phase. Furthermore, the stress caused by the expansion and contraction of the silicon phase is also relieved by the metal Me having ductility, and in this manner, the stress applied to the lithium silicate phase is relieved.

In the composite particles, generally, a plurality of primary particles including the lithium silicate phase, the silicon phase, and the metal Me are bonded to form secondary particles. The composite particles (secondary particles) have an average particle size (D50) of, for example, 1 μm or more and 25 μm or less, or 4 μm or more and 15 μm or less. In this specification, the average particle size (D50) means a particle size (volume average particle size) where a volume accumulated value becomes 50% in the particle size distribution measured by the laser diffraction scattering method. For the measurement device, for example, "LA-750" manufactured by HORIBA, Ltd. may be used.

The lithium silicate phase may have a composition represented by, for example, the formula: $Li_{2z}SiO_{2+z}$ ($0<z<2$). The lithium silicate is lightweight and has an excellent lithium ion conductivity. The lithium silicate phase may be an oxide phase including $L_1$, Si, and O, and may include other elements. The atomic ratio of O to Si in the lithium silicate phase:O/Si is, for example, larger than 2 and less than 4. Preferably, 0/Si is larger than 2 and less than 3. The atomic ratio of Li to Si in the lithium silicate phase:Li/Si is, for example, larger than 0 and less than 4. Preferably, the relation $0<z<1$ is satisfied, and $z=\frac{1}{2}$ is more preferable.

The lithium silicate phase may include, in addition to Li, Si, and O, other element M1. The element M1 may be, for example, at least one selected from the group consisting of K, Na, Mg, Ca, B, Al, Nb, Ta, La, Y, P, Bi, Sb, Co, Er, F, and W. Depending on the type of the element M1, the ion conductivity of the silicate phase improves. Also, resistance of the silicate phase to the electrolyte improves. For example, in view of improvement in the initial charge and discharge efficiency, the element M1 is preferably La.

The element M1 may form a compound. The compound may be, depending on the type of the element M1, for example, an oxide of the element M1, or a silicate of the element M1. In the lithium silicate phase, the element M1 content relative to a total amount of the element other than oxygen is, for example, 0.3 mol % or more and 3 mol % or less.

The composition of the lithium silicate phase can be analyzed by the method below. The analysis of the composition is preferably performed by using the composite particles or the negative electrode mixture layer in a discharged state. Also, in view of avoiding effects from the decomposed product of the electrolyte, it is preferable to analyze the sample in the composite particles in a battery before charge and discharge cycles or in the initial stage of cycles.

The amount of each of the elements contained in the composite particles can be measured with, for example, ICP-AES. Specifically, a sample of the composite particles is completely dissolved in a heated acid solution, and the carbon of the solution residue is filtered and removed, and thereafter, the obtained filtrate was analyzed with ICP-AES, to measure the spectrum intensity of each element. Subsequently, a calibration curve is prepared using standard solutions of commercially available elements, and the amount of each of the elements contained is calculated.

When analyzing the composition of the lithium silicate phase, the composite particles may be taken out from the battery by, for example, the method below. Specifically, the battery (completely discharged state) is decomposed to take out the negative electrode, and the negative electrode is washed with anhydrous ethyl methyl carbonate or dimethyl carbonate to remove the electrolyte. Next, the negative electrode mixture layer is peeled off from the negative electrode current collector and ground in a mortar to obtain a sample powder. Next, the sample powder is dried in a dry atmosphere for 1 hour and immersed in a weakly boiled 6M hydrochloric acid for 10 minutes to remove alkali metals such as Na and Li which can be contained in a binder or the like. Next, the sample powder is washed with ion-exchanged water, filtered off, and dried at 200° C. for 1 hour. Afterwards, in an oxygen atmosphere, only the composite particles can be isolated by heating to remove the carbon components.

The lithium silicate phase and the silicon phase in the composite particles can be distinguished and quantified by using Si-NMR. As described above, the Si content produced by ICP-AES is a total of the Si amount forming the silicon phase and the Si amount in the lithium silicate phase. On the other hand, the amount of Si forming the silicon phase can be separately quantified using Si-NMR. Thus, by deducting the Si amount forming the silicon phase from the Si content obtained by ICP-AES, the Si amount in the lithium silicate phase can be quantified. A mixture containing lithium silicate with a known Si content and silicon particles at a predetermined ratio may be used for the standard substance required for quantitation.

Preferable Si-NMR measurement conditions are shown below.

<Si-NMR Measurement Conditions>

Measurement device: manufactured by Varian Medical Systems, solid-state nuclear magnetic resonance spectrum measurement device (INOVA-400)

Probe: Varian 7 mm CPMAS-2

MAS: 4.2 kHz

MAS speed: 4 kHz

Pulse: DD (45° pulse+signal uptake time 1H decoupled)

Repetition time: 1200 sec to 3000 sec

Observation width: 100 kHz

Observation center: near −100 ppm

Signal uptake time: 0.05 sec

Number of times of accumulation: 560

Sample volume: 207.6 mg

Furthermore, the elements of the composite particles can also be quantified by a SEM-EDX analysis, an Auger electron spectroscopy (AES), a laser ablation ICP mass spectroscopy (LA-ICP-MS), an X-ray photoelectron spectroscopy (XPS), and the like.

For example, the quantification of the elements in the composite particles by a SEM-EDX analysis can be performed by cross sectional observation of the composite particles on cross sections of the negative electrode mixture layer. The cross sectional observation can be performed, for example, by the method below. First, the battery is disassembled, and the negative electrode is taken out. A cross section polisher (CP) is used to obtain cross sections of the negative electrode mixture layer. A scanning electron microscope (SEM) is used to observe the cross sections of the negative electrode mixture layer. From the cross-sectional image of the reflected electron image of the negative electrode mixture layer, 10 composite particles having the maximum diameter of 5 μm or more are randomly selected, and the respective composite particles are analyzed by element mapping by an energy-dispersive X-ray (EDX). The area where the target element is contained is calculated using an image analysis software. The observation magnification is desirably 2000 to 20000. The area where the predetermined element is contained is measured from 10 particles, and the measured values are averaged.

In the course of charge and discharge, a coating is formed on the surfaces of the composite particles by decomposition of the electrolyte or the like. Also, the composite particles may include a conductive layer on its surface. Therefore, mapping analysis by EDX is performed for the region inner from the peripheral edge of the cross-section of the composite particles by 1 μm or more, so that the measuring range does not include the coating or the conductive layer.

Preferable cross sectional SEM-EDX analysis measurement conditions are shown below.

<SEM-EDX Measurement Conditions>

Processing Equipment: SM-09010 (Cross Section Polisher) manufactured by JEOL

Processing conditions: Acceleration voltage 6 kV

Electric current value: 140 μA

Degree of vacuum: $1 \times 10^{-3}$ to $2 \times 10^{-3}$ Pa

Measurement device: electron microscope manufactured by HITACHI, SU-70

Acceleration voltage at analysis: 10 kV

Field: Free mode

Probe electric current mode: Medium

Probe electric current range: High

Anode Ap.: 3

OBJ Ap.: 2

Analysis area: 1 μm square

Analysis soft: EDAX Genesis

CPS: 20500

Lsec: 50

Time constant: 3.2

In view of achieving a high capacity and improving cycle characteristics, the composite particles preferably contain the silicon phase of, for example, 30 mass % or more and 80 mass % or less. By setting the silicon phase content to 30 mass % or more, the ratio of the lithium silicate phase is reduced, and the initial charge and discharge efficiency is easily improved. By setting the silicon phase content to 80 mass % or less, the degree of expansion and contraction of the composite particles during charging and discharging can be easily reduced. The silicon phase content in the composite particles is preferably 40 mass % or more, more preferably 50 mass % or more.

In the secondary battery immediately after preparation of the composite particles or before initial charging, in the lithium silicate phase of the composite particles, the silicon phase may be dispersed as particles. In view of forming a net structure with $D_1/D_2$ of 3 or more, the particle size (maximum diameter) of the particulate silicon phase included in the composite particles may be in a range of, for example, 20 nm or more and 200 nm or less. In view of relieving the stress caused by the expansion and contraction of the silicon phase, and suppressing cracking of the particles due to the stress, the particulate silicon phase included in the composite particles may have an average particle size of 100 nm or less, 70 nm or less, or 50 nm or less. The average particle size of the silicon phase can be determined by measuring the maximum diameter of arbitrary 100 silicon phases using SEM images or TEM images of cross sections of the composite particles, and averaging them.

At least a portion of the surface of the composite particles may be covered with a conductive layer. By forming a conductive layer on the surface of the composite particles, electrical conductivity of the composite particles can be dramatically increased. The conductive material forming the conductive layer is preferably a carbon material. Preferably, the carbon material includes at least one selected from the group consisting of a carbon compound and a carbonaceous substance.

Preferably, the thickness of the conductive layer should be substantially thin enough not to affect the average particle size of the composite particles. The thickness of the conductive layer is preferably 1 to 200 nm, and more preferably 5 to 100 nm considering securement of the conductivity and diffusivity of lithium ions. The thickness of the conductive layer can be measured by cross sectional observation of the composite particles using SEM or TEM.

Examples of the carbon compound include a compound containing, for example, carbon and hydrogen, and a compound containing carbon, hydrogen, and oxygen. As the carbonaceous substance, amorphous carbon having low crystallinity, graphite having high crystallinity, or the like can be used. Examples of the amorphous carbon include carbon black, coal, coke, charcoal, and activated carbon. Examples of the graphite include natural graphite, artificial graphite, graphitized mesophase carbon particles, and the like. Among them, amorphous carbons are preferable because of their low hardness and their large buffering effects on silicon particles, which change the volume by charging and discharging. The amorphous carbon may be graphitizable carbon (soft carbon) or non-graphitizable carbon (hard carbon). Examples of the carbon black include acetylene black and Ketjen black.

Next, an example of a method for producing composite particles is described.

Step (i)

As a raw material of lithium silicate, a raw material mixture containing a Si raw material and a $L_1$ raw material at a predetermined ratio is used. Also, the above-described element M1 can be included in the raw material mixture. A raw material mixture is dissolved, and the melt is flaked through a metal roll to prepare a lithium silicate. Thereafter, the flaked silicate is crystallized by heat treatment at a temperature of a glass transition point or more, and the melting point or less in an air atmosphere. The flaked silicate may be used without crystallization. Silicate may also be produced by solid phase reaction by baking the raw material mixture at a temperature of the melting point or less without dissolving the mixture.

For the Si raw material, silicon oxide can be used. For the Li raw material, for example, lithium carbonate, lithium oxide, lithium hydroxide, lithium hydride, and the like can be used. These may be used singly, or two or more kinds may be used in combination. The examples of the element M1 raw material include oxides, hydroxides, carbonates, hydrides, nitrates, and sulfates of the elements.

Step (ii)

Next, a raw material silicon is blended into lithium silicate to form a composite. For example, the composite particles are produced by the steps (a) to (c) below.

Step (a)

A raw material silicon powder and a lithium silicate powder are mixed, for example, at a mass ratio of 20:80 to 95:5, thereby producing a mixture powder.

For the raw material silicon powder, for example, a silicon powder with a wide range of particle size may be used, or a silicon powder having two peaks in volume-based particle size distribution may be used. Of the two peaks, the difference between the particle size corresponding to one peak and the particle size corresponding to the other peak is, for example, 50 μm or more. For the raw material silicon powder, for example, a coarse silicon powder (e.g., average particle size (D50) of 80 μm or more and 300 μm or less) and a silicon micropowder (e.g., average particle size (D50) of 1 μm or more and 20 μm or less) are mixed at a predetermined mass ratio and may be used. With the particle size distribution of the raw material silicon powder, $D_1/D_2$ at the time of net structure formation can be adjusted.

Furthermore, to the above-described mixture powder, a metal Me (e.g., Fe) powder is added. The metal Me powder can also be added to the raw material mixture of the step (i) instead of adding to the mixture powder in the step (a).

Step (b)

Next, using a grinder such as a ball mill, a mixture of the raw material silicon and the lithium silicate is ground and composed while micronization. At this time, an organic solvent may be added to the mixture for wet-grinding. The organic solvent serves to prevent the object to be ground from adhering to the inner wall of the grinding vessel. For example, in the case of a ball mill, the grind time, the number of revolutions of the pot, charging amount of the balls, and the like can be changed to adjust $D_1/D_2$ at the time of the formation of the net structure.

As the organic solvent, alcohol, ether, fatty acid, alkane, cycloalkane, silicate ester, metal alkoxide, or the like can be used.

Each of the raw material silicon and lithium silicate may be separately converted into fine particles and then mixed. Also, instead of using a grinder, silicon nanoparticles and noncrystalline lithium silicate nanoparticles may be produced and mixed. For producing the nanoparticles, a known method such as a gas phase method (e.g., a plasma method) or a liquid phase method (e.g., a liquid phase reduction method) may be used.

Step (c)

Next, a pressure is applied to the mixture in, for example, an inert gas atmosphere (e.g., atmosphere of argon, nitrogen, and the like) while heated to 600° C. to 1000° C., and sintered. For sintering, a sintering device that can apply pressure in an inert atmosphere, such as a hot press can be used. Upon sintering, silicate softens and flows to fill the gaps between the silicon particles. As a result, a dense block sintered product having a sea portion of the silicate phase and an island portion of the silicon phase and the metal Me can be produced. The produced sintered product is ground to produce composite particles.

Step (iii)

Subsequently, at least a portion of the surface of the composite particles is covered with a conductive material to form a conductive layer. As a method of coating the surface of the composite particles with a conductive carbon material, a CVD method using a hydrocarbon gas such as acetylene or methane as a raw material, a method in which a coal pitch, a petroleum pitch, a phenol resin, or the like is mixed with composite particles and heated in an inert atmosphere (e.g., atmosphere of argon, nitrogen, and the like) at 700° C. to 950° C. and carbonized can be exemplified. Further, carbon black may be adhered to the surface of the composite particles.

Step (iv)

A step of washing the composite particles (including a case where a conductive layer is included at the surface) with acid can be performed. For example, by washing the composite particles with an acidic aqueous solution, a trace amount of alkali component that may be generated when forming the raw material silicon and lithium silicate into a composite can be dissolved and removed. As the acidic aqueous solution, an aqueous solution of an inorganic acid such as hydrochloric acid, hydrofluoric acid, sulfuric acid, nitric acid, phosphoric acid, or carbonic acid, or an aqueous solution of an organic acid such as citric acid or acetic acid can be used.

Figure 3:
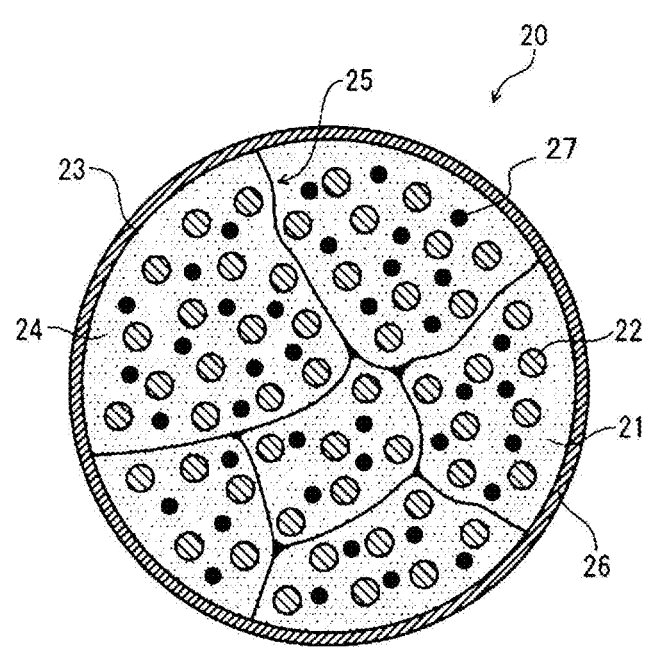
FIG. 3 is a cross sectional view schematically showing a negative electrode active material (composite particles) included in a secondary battery before an initial charge.

FIG. 3 schematically shows a cross section of a composite particle 20 with its surface covered with a conductive layer as an example of a negative electrode active material included in a secondary battery before initial charging.

The composite particle 20 includes a mother particle 23 formed with secondary particles of plurality of coagulated primary particles 24. The mother particle 23 (primary particle 24) includes a lithium silicate phase 21, and a silicon phase 22 dispersed in the lithium silicate phase 21. The mother particle 23 has a structure in which a fine particulate silicon phase 22 is dispersed in a matrix of the lithium silicate phase 21. At an interface 25 of the primary particles 24, carbon (noncrystalline carbon) derived from the organic solvent used in the step (b) may be present.

Furthermore, fine metal Me particles 27 are dispersed in the lithium silicate phase 21. The metal Me particles 27 have an average particle size of, for example, 1 nm or more and 100 nm or less. The average particle size of the metal Me particles 27 can be determined by measuring the maximum diameter of arbitrary 100 metal Me particles using SEM images or TEM images of cross sections of the composite particles, and averaging them. The metal Me particles have an average particle size of, even after initial charge and discharge, for example, 1 nm or more and 100 nm or less.

At least a portion of the surface of the mother particle 23 may be covered with a conductive layer 26. Along with repetitive charge and discharge, the particulate silicon phases 22 next to each other connect and may form a silicon phase having a net structure. The lithium silicate phase 21 may further include an element M1.

Next, a secondary battery of an embodiment of the present invention includes a positive electrode, a negative electrode, and an electrolyte. The negative electrode includes a negative electrode active material including the above-described composite particles. In the following, the negative electrode, the positive electrode, and the electrolyte included in the secondary battery in an embodiment of the present invention are described.

[Negative Electrode]

The negative electrode has, for example, a negative electrode current collector, and a negative electrode mixture layer formed on the negative electrode current collector surface and having a negative electrode active material. The negative electrode mixture layer can be formed, for example, by coating a surface of the negative electrode current collector with a negative electrode slurry in which a negative electrode mixture is dispersed in a dispersion medium, and drying the slurry. The dried coating film may be rolled, if necessary.

The negative electrode mixture includes a negative electrode active material including the composite particles above as an essential component, and may include a binder, a conductive agent, a thickener, and the like as optional components. The silicon phase of the composite particles can store a large amount of lithium ions, and therefore a high capacity negative electrode can be obtained.

The negative electrode active material may further include other active materials that electrochemically store and release lithium ions. As the other active materials, for example, a carbon-based active material is preferable. The volume of the composite particles expands and contracts along with charge and discharge, and therefore with an increase in ratio thereof in the negative electrode active material, contact failure between the negative electrode active material and the negative electrode current collector tends to occur with charging and discharging. Meanwhile, by using the composite particles and the carbon-based active material in combination, while imparting a high capacity of the silicon phase to the negative electrode, excellent cycle characteristics can be achieved. Preferably, the ratio of the composite particles relative to a total of the composite particles and the carbon-based active material is, for example, preferably 0.5 to 15 mass %, more preferably 1 to 5 mass %. This allows achievement in both higher capacity and improved cycle characteristics easily.

Examples of the carbon-based active material include graphite, graphitizable carbon (soft carbon), non-graphitizable carbon (hard carbon), and the like. Preferred among them is graphite, which is excellent in stability during charging and discharging and has small irreversible capacity. Graphite means a material having a graphite type crystal structure, and includes, for example, natural graphite, artificial graphite, graphitized mesophase carbon particles, and the like. A kind of carbon-based active material may be used singly, or two or more kinds may be used in combination.

As the negative electrode current collector, a non-porous conductive substrate (metal foil, etc.), and a porous conductive substrate (mesh-body, net-body, punched sheet, etc.) are used. For the material of the negative electrode current collector, stainless steel, nickel, nickel alloy, copper, copper alloy or the like can be exemplified.

Examples of the binder include fluororesin, polyolefin resin, polyamide resin, polyimide resin, vinyl resin, styrene-butadiene copolymer rubber (SBR), polyacrylic acid, and derivatives thereof. These may be used singly or in combination of two or more.

Examples of the conductive agent include carbon black, conductive fibers, fluorinated carbon, and organic conductive materials. These may be used singly or in combination of two or more.

Examples of the thickeners include carboxymethyl cellulose (CMC) and polyvinyl alcohol. These may be used singly or in combination of two or more.

Examples of the dispersion medium include water, alcohol, ether, N-methyl-2-pyrrolidone (NMP), or a mixture solvent thereof

[Positive Electrode]

The positive electrode has, for example, a positive electrode current collector, and a positive electrode mixture layer formed on the surface of the positive electrode current collector. The positive electrode mixture layer can be formed, for example, by coating a surface of the positive electrode current collector with a positive electrode slurry in which a positive electrode mixture is dispersed in a dispersion medium, and drying the slurry. The dried coating film may be rolled, if necessary.

The positive electrode mixture includes a positive electrode active material as an essential component, and may include a binder, a conductive agent, and the like as optional components.

As the positive electrode active material, a lithium composite metal oxide can be used. Examples of the lithium composite metal oxide include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. M is at least one selected from the group consisting of Na, Mg, Sc, Y, Mn, Fe, Co, Ni, Cu, Zn, Al, Cr, Pb, Sb, and B. Me includes at least a transition element (e.g., at least one selected from the group consisting of Mn, Fe, Co, and Ni). Here, $0 \leq a \leq 1.2$, $0 \leq b \leq 0.9$, and $2.0 \leq c \leq 2.3$. The value "a" indicating the molar ratio of lithium is a value immediately after the active material is produced, and is increased or decreased by charge and discharge.

As the binder and the conductive agent, those exemplified for the negative electrode can be used. As the conductive agent, graphite such as natural graphite or artificial graphite may be used.

For the positive electrode current collector, a conductive substrate in accordance with the negative electrode current collector can be used. Examples of the material for the positive electrode current collector include stainless steel, aluminum, aluminum alloy, titanium or the like.

[Electrolyte]

The electrolyte includes a solvent and a lithium salt dissolved in the solvent. The concentration of the lithium salt in the electrolyte is, for example, 0.5 to 2 mol/L. The electrolyte may contain a known additive.

As the solvent, an aqueous solvent or a non-aqueous solvent is used. As the non-aqueous solvent, for example, cyclic carbonate, chain carbonate, cyclic carboxylate, chain carboxylate, or the like is used. Examples of the cyclic carbonate include propylene carbonate (PC), ethylene carbonate (EC), and the like. Examples of the chain carbonate include diethyl carbonate (DEC), ethyl methyl carbonate (EMC), dimethyl carbonate (DMC), and the like. Examples of the cyclic carboxylate include γ-butyrolactone (GBL) and γ-valerolactone (GVL). Examples of the chain carboxylate include methyl formate, ethyl formate, propyl formate, methyl acetate, ethyl acetate, propyl acetate, methyl propionate, ethyl propionate, and propyl propionate. A kind of non-aqueous solvent may be used singly, or two or more kinds thereof may be used in combination.

As the lithium salt, a lithium salt of, for example, chlorine-containing acid (such as $LiClO_4$, $LiAlCl_4$, $LiB_{10}Cl_{10}$), a lithium salt of fluorine-containing acid (such as $LiPF_6$, $LiBF_4$, $LiSbF_6$, $LiAsF_6$, $LiCF_3SO_3$, $LiCF_3CO_2$), a lithium salt of fluorine-containing acid imide (such as $LiN(CF_3SO_2)_2$, $LiN(CF_3SO_2)(C_4F_9SO_2)$, $LiN(C_2F_5SO_2)_2$, or the like), a lithium halide (LiCl, LiBr, LiI, or the like), or the like can be used. A kind of lithium salt may be used singly, or two or more kinds thereof may be used in combination.

[Separator]

It is desirable to interpose a separator between the positive electrode and the negative electrode. The separator has excellent ion permeability and suitable mechanical strength and electrically insulating properties. The separator may be, for example, a microporous thin film, a woven fabric, or a nonwoven fabric. As a material of the separator, for example, a polyolefin such as polypropylene or polyethylene may be used.

The structure of the secondary battery can be, for example, a structure in which an electrode group formed by winding a positive electrode and a negative electrode with a separator interposed therebetween and an electrolyte are accommodated in an outer case. Alternatively, instead of the wound-type electrode group, other forms of electrode groups may be applied, such as a laminated electrode group in which the positive electrode and the negative electrode are laminated with a separator interposed therebetween. The secondary batteries may be of any form, for example, a cylindrical type, prismatic type, coin type, button type, laminated type, etc.

Figure 4:
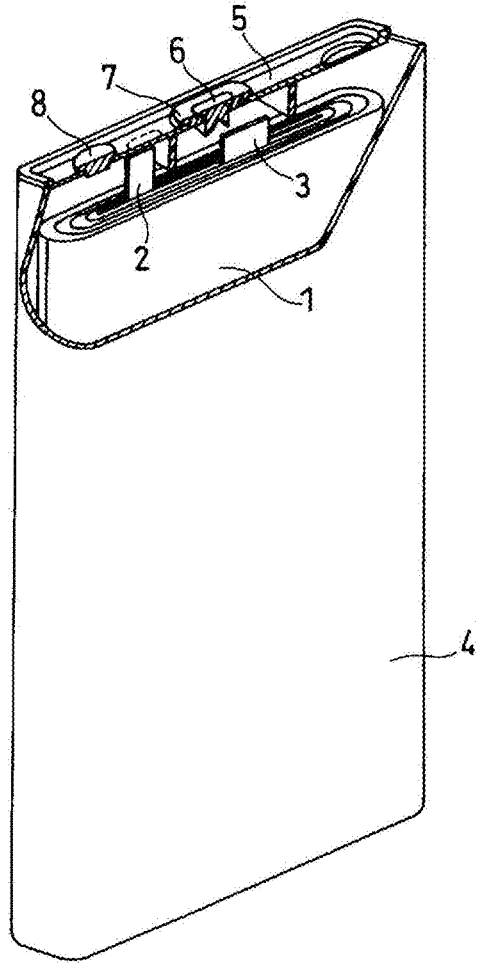
FIG. 4 is a schematic partially cutaway oblique view of a secondary battery in an embodiment of the present disclosure.

In the following, a structure of a prismatic non-aqueous electrolyte secondary battery is described with reference to FIG. 4 as an example of the secondary battery of the present invention.

The battery includes a bottomed prismatic battery case 4, an electrode group 1 and a non-aqueous electrolyte (not shown) accommodated in the battery case 4. The electrode group 1 has a negative electrode in the form of a long strip, a positive electrode in the form of a long strip, and a separator interposed therebetween. A negative electrode current collector of the negative electrode is electrically connected to a negative electrode terminal 6 provided in a sealing plate 5 through a negative electrode lead 3. The negative electrode terminal 6 is insulated from the sealing plate 5 with a resin gasket 7. A positive electrode current collector of the positive electrode is electrically connected to a rear face of the sealing plate 5 through a positive electrode lead 2. That is, the positive electrode is electrically connected to the battery case 4 also serving as a positive electrode terminal. The periphery of the sealing plate 5 is fitted to the open end of the battery case 4, and the fitting portion is laser welded. An injection hole for the non-aqueous electrolyte is provided in the sealing plate 5 and is plugged with a sealing plug 8 after the injection.

In the following, the present invention will be described in detail based on Examples and Comparative Examples, but the present invention is not limited to Examples below.

Example 1

[Lithium Silicate Synthesis]

Lithium carbonate and silicon dioxide were mixed to give a molar ratio of $Li_2CO_3:SiO_2=34:66$, and the mixture is baked in an air atmosphere at 750° C. for 5 hours to produce lithium silicate ($Li_2Si_2O_5$). A lithium silicate powder (average particle size (D50) 10 μm) was produced by grinding.

[Composite Particles Preparation]

In an inert atmosphere, a Si powder and a $Li_2Si_2O_5$ powder (average particle size (D50) 10 μm) were mixed at a mass ratio of 58:42, and an iron powder (average particle size (D50) 100 μm) was further added in a predetermined amount, and charged into a pot (SUS-made, volume: 500 mL) of a planetary ball mill (manufactured by Fritsch Co., Ltd. P-5). For the Si powder, a Si coarse powder (average particle size (D50) 150 μm), and a Si micropowder (average particle size (D50) 10 μm) were mixed at a mass ratio of 1:9 and used.

Twenty four balls made of SUS (diameter: 20 mm) were placed in the pot. The lid was closed, and the mixture was subjected to grinding at 200 rpm for 50 hours. Afterwards, the powder was taken out in an inert atmosphere, and heated in an inert atmosphere at 800° C. for 4 hours, thereby producing composite particles A1 including 1 mass % of iron. The iron content was measured with ICP-AES.

The composite particles A1 were ground, and allowed to pass through a 40 μm mesh, and then mixed with coal pitch (manufactured by JFE Chemical Co., Ltd., MCP250) and heated in an inert atmosphere at 800° C., thereby forming a conductive layer by covering the surface of the composite particles A1 with carbon. The coverage with carbon was about 5 mass % relative to a total of the composite particles A1 and the conductive layer. Afterwards, using a sieve, the composite particles A1 (average particle size (D50) 5 μm) having a conductive layer were produced.

[Negative Electrode Production]

A mixture including the composite particles A1 having a conductive layer and graphite at a mass ratio of 5:95 was mixed with a sodium salt of carboxymethyl cellulose (CMC-Na), and styrene-butadiene rubber (SBR) at a mass ratio of 97.5:1.0:1.5, and after adding water, the mixture was stirred using a mixer (T.K. HIVIS MIX manufactured by PRIMIX Corporation), thereby preparing a negative electrode slurry. Then, the negative electrode slurry was applied on both surfaces of a copper foil, and the coating was dried, and rolled, thereby producing a negative electrode A1 having a negative electrode mixture layer with a density of 1.6 g/cm³ on both surfaces of the copper foil.

[Positive Electrode Production]

Lithium cobaltate, acetylene black, and polyvinylidene fluoride were mixed at a mass ratio of 95:2.5:2.5, and stirred using a mixer (T.K. HIVIS MIX, manufactured by PRIMIX Corporation) after adding N-methyl-2-pyrrolidone (NMP) to prepare a positive electrode slurry. Then, the positive electrode slurry was applied on both surfaces of an aluminum foil, and the coating was dried, and rolled, thereby producing a positive electrode having a positive electrode mixture layer with a density of 3.6 g/cm³ on both surfaces of the aluminum foil.

[Non-Aqueous Electrolyte Preparation]

To a solvent mixture including ethylene carbonate (EC) and ethyl methyl carbonate (EMC) at a volume ratio of 3:7, $LiPF_6$ was dissolved with a concentration of 1.0 mol/L, thereby preparing a non-aqueous electrolyte.

[Secondary Battery Production]

A tab was attached to each of the electrodes, and an electrode group was produced by winding the positive electrode and the negative electrode A1 in a spiral shape with a separator interposed so that the tabs were positioned at the outermost peripheral portion. The electrode group was inserted into an exterior body made of an aluminum laminate film, dried in vacuo at 105° C. for 2 hours, and then the non-aqueous electrolyte was injected. The opening of the exterior body was sealed to obtain a secondary battery A1.

Example 2

Composite particles A2, a negative electrode A2, and a secondary battery A2 were produced in the same manner as in Example 1, except that in the preparation of the composite particles, for the Si powder, a Si coarse powder (average particle size (D50) 500 μm) and a Si micropowder (average particle size (D50) 10 μm) were mixed at a mass ratio of 1:9 and used.

Example 3

Composite particles A3, a negative electrode A3, and a secondary battery A3 were produced in the same manner as in Example 1, except that in the preparation of the composite particles, for the Si powder, a Si coarse powder (average particle size (D50) 150 μm) and a Si micropowder (average particle size (D50) 10 μm) were mixed at a mass ratio of 8:2 and used.

Comparative Example 1

In the preparation of the composite particles, for the Si powder, only a Si micropowder (average particle size (D50) 10 μm) was used. The iron powder was not added to the mixture of the Si powder and $Li_2Si_2O_5$ powder. Except for the above, composite particles B1, a negative electrode B1, and a secondary battery B1 were produced in the same manner as in Example 1.

Comparative Example 2

In the preparation of the composite particles, for the Si powder, only a Si micropowder (average particle size (D50) 10 μm) was used. The grinding with the ball mill was performed for 40 hours. The iron powder was not added to the mixture of the Si powder and $Li_2Si_2O_5$ powder. Except for the above, composite particles B2, a negative electrode B2, and a secondary battery B2 were produced in the same manner as in Example 1.

Comparative Example 3

In the preparation of the composite particles, for the Si powder, only a Si micropowder (average particle size (D50) 10 μm) was used. The grinding with the ball mill was performed for 40 hours. Except for the above, composite particles B3, a negative electrode B3, and a secondary battery B3 were produced in the same manner as in Example 1.

Comparative Example 4

In the preparation of the composite particles, composite particles B4, a negative electrode B4, and a secondary battery B4 were produced in the same manner as in Example 1, except that the iron powder was not added to the mixture of the Si powder and the $Li_2Si_2O_5$ powder.

[Charge and Discharge Cycle Test]

A charge and discharge cycle test was performed for the batteries of Examples and Comparative Examples.

<Charge>

Constant current charging was performed at 25° C. at a current of 1 It (800 mA) until the voltage reached 4.2 V, and thereafter, constant voltage charging was performed at a voltage of 4.2 V until the electric current reached $\frac{1}{20}$ It (40 mA).

<Discharge>

Constant current discharge was performed at 25° C. at a current of 1 It (800 mA) until the voltage reached 2.75 V.

The rest period between charging and discharging was 10 minutes. The ratio (percentage) of a discharge capacity at the 1st cycle relative to the charge capacity at the 1st cycle was determined as an initial charge and discharge efficiency (%). The ratio (percentage) of a discharge capacity at the 50th cycle relative to the discharge capacity at the 1st cycle was determined as a capacity retention rate (%) at the 50th cycle.

The evaluation results are shown in Table 1. In Table 1, the initial charge and discharge efficiency and the capacity retention rate are shown as relative values setting the initial charge and discharge efficiency and the capacity retention rate of the battery B1 of Comparative Example 1 as 100.

[Composite Particle Analysis Immediately after Composite Particle Preparation]

The composite particles were analyzed with XRD, and in the XRD pattern of all of the composite particles, peaks derived from Si and $Li_2Si_2O_5$ were confirmed.

For the composite particles A1 to A3, SEM observation was performed for cross sections of the particles, and it was confirmed that the particulate silicon phase dispersed substantially homogeneously in the lithium silicate phase. It was also confirmed that in the lithium silicate phase, Fe particles (metal Me particles) were dispersed substantially homogeneously.

The average particle size of the silicon phase determined with the above-described method was, in the composite particles A1, 10 nm, in the composite particles A2, 15 nm, and in the composite particles A3, 30 nm. The average particle size of the Fe particles determined with the above-described method was, in the composite particles A1, 15 nm, in the composite particles A2, 20 nm, and in the composite particles A3, 30 nm.

For the composite particles B1 to B4, SEM observation was performed for cross sections of the particles, and it was confirmed that the particulate silicon phase was dispersed substantially homogeneously in the lithium silicate phase. It was also confirmed that in the composite particles B3, Fe particles were dispersed substantially homogeneously in the lithium silicate phase.

[Composite Particle Analysis after Charge and Discharge Cycle Test]

The batteries (completely discharged state) of Examples and Comparative Examples after charge and discharge cycle test were decomposed, and the negative electrode was taken out, and it was confirmed that the silicon phase formed a net structure with the above described method. Furthermore, the maximum diameter $D_1$ of the lined portions forming the net structure, the ratio of the maximum diameter $D_1$ relative to the minimum diameter $D_2$ of the lined portions forming the net structure: $D_1/D_2$, and the ratio of the number of the lined portions $N_1$ with a diameter (the above-described diameter $D_3$) of 20 nm or less relative to a total number of the lined portions forming the net structure $N_0$: $N_1/N_0$ were determined. Table 1 shows the analysis results.

TABLE 1

| | | | | | | Evaluation | |
| | Composite particles | | | | | Initial charge and discharge | 50th |
| | Silicon phase | | | | Silicate | efficiency | cycle capacity |
| Battery | $D_1/D_2$ | $D_1$ (nm) | $N_1/N_0$ | Metal Me | phase composition | (relative value) | retention rate (relative value) |
|---|---|---|---|---|---|---|---|
| A1 | 5.2 | 21.7 | More than 1/2 | present | $Li_2Si_2O_5$ | 121 | 128 |
| A2 | 13.6 | 66.5 | More than 1/2 | present | $Li_2Si_2O_5$ | 113 | 104 |
| A3 | 5.8 | 39.9 | 1/2 or less | present | $Li_2Si_2O_5$ | 115 | 103 |
| B1 | 2.8 | 9.8 | More than 1/2 | absent | $Li_2Si_2O_5$ | 100 | 100 |
| B2 | 2.4 | 18.2 | More than 1/2 | absent | $Li_2Si_2O_5$ | 102 | 93 |
| B3 | 2.4 | 16.8 | More than 1/2 | present | $Li_2Si_2O_5$ | 111 | 101 |
| B4 | 5.2 | 21.7 | More than 1/2 | absent | $Li_2Si_2O_5$ | 103 | 95 |

The batteries A1 to A3 showed a high initial charge and discharge efficiency and a high capacity retention rate compared with the batteries B1 to B4. Of the batteries A1 to A3, the battery A1 with $D_1$ of 60 nm or less and $N_1/N_0$ of more than ½ showed a particularly high initial charge and discharge efficiency and capacity retention rate.

With the battery B4, a higher initial charge and discharge efficiency was obtained than that of the battery B1, but the capacity retention rate decreased. In contrast, the battery A1 achieved a higher capacity retention rate than that of the battery B 1, while achieving a high initial charge and discharge efficiency. It is assumed that in the battery A1, the metal Me was dispersed in the lithium silicate phase, and therefore in the composite particles including the thick lined portion of the net structure of the silicon phase, cracking of the particles was suppressed during charge and discharge cycles.

Comparing the battery B2 with the battery B3 both having $D_1/D_2$ of 2.4, the initial charge and discharge efficiency and the capacity retention rate improved by values of 9 and 8, respectively. In contrast, comparing the battery B4 with the battery A1 both having $D_1/D_2$ of 5.2, the improvement was by values of 18 and 33. As described above, regarding the initial charge and discharge efficiency and capacity retention rate, the degree of improvement from the battery B4 to the battery A1 was much better than that of the battery B2 to the battery B3. It shows that by dispersing the silicon phase with $D_1/D_2$ of 3 or more in the silicate phase, and the metal Me, the initial charge and discharge efficiency and capacity retention rate improves greatly.

INDUSTRIAL APPLICABILITY

The negative electrode active material for a secondary battery of the present invention is useful in a secondary battery for a main power source of a mobile communication device, a portable electronic device, or the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: electrode group, 2: positive electrode lead, 3: negative electrode lead, 4: battery case, 5: sealing plate, 6: negative electrode terminal, 7: gasket, 8: sealing plug, 20: composite particles, 21: lithium silicate phase, 22: silicon phase, 23: mother particles, 24: primary particles, 25: primary particles interface, 26: conductive layer, 27: metal Me particles

The invention claimed is:

1. A negative electrode active material for a secondary battery comprising:
  composite particles including a lithium silicate phase and a silicon phase dispersed in the lithium silicate phase, wherein
    the silicon phase has lined portions in the lithium silicate phase,
    a maximum diameter $D_1$ and a minimum diameter $D_2$ of the lined portions satisfy $3 \leq D_1/D_2$,
    the composite particles include a metal Me dispersed in the lithium silicate phase, and
    the metal Me is at least one selected from the group consisting of Fe, Pb, Zn, Sn, Cu, Ni, Cr, Zr, and Ti.

2. The negative electrode active material for a secondary battery of claim 1, wherein the maximum diameter $D_1$ is 60 nm or less.

3. The negative electrode active material for a secondary battery of claim 1, wherein more than half of the lined portions have a diameter of 20 nm or less.

4. The negative electrode active material for a secondary battery of claim 1, wherein the lined portions include a lined portion $L_1$ and a lined portion $L_2$,
  the lined portion $L_1$ has a diameter of $(D_2+10)$ nm or more and $D_1$ nm or less,
  the lined portion $L_2$ has a diameter of $D_2$ nm or more and less than $(D_2+10)$ nm,
  a difference between the maximum diameter $D_1$ and the minimum diameter $D_2$ is more than 10 nm, and
  a ratio of $NL_2$ relative to $NL_1:NL_2/NL_1$ is 5 or more and 20 or less, the $NL_2$ being a number of the lined portion $L_2$, and the $NL_1$ being a number of the lined portion $L_1$.

5. The negative electrode active material for a secondary battery of claim 1, wherein particles of the metal Me have an average particle size of 1 nm or more and 100 nm or less.

6. A secondary battery comprising a positive electrode, a negative electrode, and an electrolyte, wherein
  the negative electrode includes the negative electrode active material for a secondary battery of claim 1.

* * * * *